United States Patent [19]

Crummenauer et al.

[11] Patent Number: 5,532,461
[45] Date of Patent: Jul. 2, 1996

[54] BOTTOM-HEATED UTENSIL FOR CONDUCTIVE OR INDUCTION HEATING

[75] Inventors: Michael Crummenauer, Oberworesbach; Uwe Dietrich, Schwollen; Alfred Galle, Idar-Oberstein, all of Germany

[73] Assignee: Fissler GmbH, Idar-Oberstein, Germany

[21] Appl. No.: 419,675

[22] Filed: Apr. 10, 1995

[30] Foreign Application Priority Data

Apr. 15, 1994 [DE] Germany ............ 44 12 943.2

[51] Int. Cl.⁶ ............... H05B 6/12; A47J 27/00
[52] U.S. Cl. ............... 219/621; 126/390; 99/422
[58] Field of Search ............ 219/621; 126/390; 99/422, DIG. 14

[56] References Cited

U.S. PATENT DOCUMENTS

| 104,764 | 6/1870 | Plympton | 126/390 |
| 2,136,708 | 11/1938 | Patrick | 126/390 |
| 4,544,818 | 10/1985 | Minamida | 219/621 |
| 4,564,001 | 1/1986 | Maeda | 126/390 |
| 4,646,935 | 3/1987 | Ulam | 219/621 |
| 4,790,292 | 12/1988 | Kuhn | 126/390 |

FOREIGN PATENT DOCUMENTS

91/15142  10/1991  WIPO.

Primary Examiner—Philip H. Leung
Attorney, Agent, or Firm—Herbert Dubno

[57] ABSTRACT

A cooking and/or boiling utensil for bottom thermal energy application through thermal conduction or through electromagnetic induction. The container has a round horizontal section of austenitic steel, a thermal distribution plate of suitable thickness flush against the container base of a metal with a good thermal conductivity, and a ferromagnetic plate cover against the thermal distribution plate. The ferromagnetic metal plate cover has cover recesses mainly formed as radial slots. The radial slots start at the center and end inwardly of the cover collar. The sandwich unit consisting of the container base, the thermal distribution plate and the plate cover is substantially deformation-proof due to adjustment of the container thickness of the container base and the container thickness of the plate cover on one hand and the length and width of the slots and the diameter of the center on the other, during thermal energy application through thermal expansion.

10 Claims, 6 Drawing Sheets

BOTTOM-HEATED UTENSIL FOR CONDUCTIVE OR INDUCTION HEATING

FIELD OF THE INVENTION

Our present invention relates to a bottom-heated utensil, particularly for cooking or boiling, and, especially, to a utensil for thermal-conduction heating or electromagnetic induction heating using a sandwich structure of the utensil base.

A cooking and/or boiling appliance or utensil for bottom thermal energy application through thermal conduction or electromagnetic induction with a horizontally round container made of austenitic steel including a container casing and a container base, can have a thermal distribution plate lying against the container base and consisting of a metal with a specified thickness and good thermal conductivity.

A ferromagnetic plate cover can be disposed against the container in the area between the container base and the container casing. The plate cover can be fastened in surface contact against the thermal distribution plate.

A concave base shape can be provided so that only the edge of the cooking and/or boiling appliance is positioned on the level support surface, i.e. a heated ceramic hob.

Modern applications demand that such cooking and/or boiling utensils be suited for induction ovens as well as standard electrical and gas ovens. They are consequently also referred to as all-oven cooking or boiling appliances. Induction ovens for which such cooking and/or boiling appliances are designed, operate mostly at a frequency range of $10^4$ Hz i.e. with $2.5 \times 10^4$ Hz or more, i.e. at $4.5 \times 10^4$ Hz.

In known cooking and/or boiling utensils of this type, the entire plate cover base surface contains holes and slots. In these the thermal distribution plate material is an openwork or has its holes and slots filled level with the base surface. The holes and slots hardly affect the electromagnetic induction in the stipulated frequency range but serve to provide a modified thermal expansion for the plate cover in comparison to closed plate covers.

Especially when thermal energy is applied by thermal conduction, no disturbing deformation should occur. Within the context of the invention, disturbing deformation means a deformation of the plate cover caused by thermal expansion, removing the slightly concave cold surface geometry or converting a level geometry into a significant convex bulge. Normal application shows that in known cooking and/or boiling utensils, a disturbing deformation of the aforedescribed type occurs, depending on the temperature conditions for the cooking and/or boiling media. This interferes with the application of thermal energy through thermal conduction. The base of the plate cover turns, albeit slightly, convex compared to a level support surface on which its center rests. The cooking and/or boiling appliance wobbles on the heated surface, e.g. a heated ceramic hob.

To avoid a disturbing deformation of cooking and/or boiling appliances without a thermal distribution plate and a plate cover, it is known (WO 91/15 142) to provide mainly radial grooves of sufficient depth, accommodating and compensating various thermal expansions in the surface of a one-piece container base. These cannot be incorporated in cooking and/or boiling utensils of the sandwich construction since the sandwich unit consisting of the container base, the thermal distribution plate and the plate cover, contains different materials bonded to one another and behaves differently from uniform container bases made from sheet steel or similar materials.

OBJECTS OF THE INVENTION

It is the principal object of the present invention to provide an improved appliance, especially for use with a cooking utensil and suitable for bottom heating by thermal conduction or electromagnetic induction which obviates drawbacks of prior art utensils.

More specifically, it is an object of the invention to provide an improved utensil having a sandwich structure at the bottom thereof and which facilitates heat transfer to the contents of the vessel through the bottom both by thermal conduction and electromagnetic induction.

SUMMARY OF THE INVENTION

The invention completely eliminates disturbing deformation from cooking and/or boiling utensils of the above-described sandwich construction and for the above-described purpose. It consequently optimizes cooking and/or boiling utensils and is ideally suited for thermal energy application through electromagnetic induction as well as for thermal energy application via thermal conduction.

According to the invention, the plate cover of ferromagnetic sheet metal is formed with recesses, mainly as radial slots, the radial cover recesses start at a mutual center, and the radial cover recesses end inwardly of the covering collar.

Moreover the sandwich unit of the container base, the thermal distribution plate and the plate cover are sufficiently deformation-proof due to the adjustment of the container base sheet metal thickness and the plate cover sheet metal thickness on one hand and the length and width of the cover recesses and the diameter of the closed center on the other, during thermal energy application through thermal conduction. The mutual center can be formed by a cross-over area of the radial slots, which, however, can also end before the center.

The invention is based on our discovery that in cooking and/or boiling utensils according to the invention, having the combination of features described, there is a complete suppression of disturbing deformation for stipulated plate thicknesses. The suppression of disturbing deformation can be achieved for cooking and/or boiling utensils with the aforedescribed features solely by adjusting the sheet metal thickness and the geometry and the shape of the plate cover in relation to the position, width and length of the slots and in relation to the diameter of the center.

If the radial slots end before the center, the diameter of the center will be as small as possible. The optimum adjustment can easily be determined by laboratory tests for each type of cooking and/or boiling utensil according the invention.

The adjustment of the invention takes into account the skin effect, in the preferred embodiment of the invention, depending on the frequency of the electromagnetic induction. In this context the sheet metal thickness of the plate cover is adapted to the penetration depth of the electromagnetic induction field, whose current density decreases exponentially with the penetration depth. Consequently the current density should not fall below 0.5 mm and not exceed 0.8 mm.

The sheet metal thickness of the container and consequently the container base is preferably thicker to avoid disturbing deformation. The characteristic "deformation-proof" means that due to the measures of the invention, no deformation occurs. The characteristic "deformation-proof" does not prevent the radius of the slightly concave shaped cold surface geometry from decreasing when heating the cooking and/or boiling utensil of the invention and especially during thermal conduction heating, the plate cover thus from becoming more concave. The invention, however, greatly limits this change.

The cooking and/or boiling utensil of the invention can be modified and shaped in different ways. Preferably, the components of the sandwich units are connected in surface bonding to one another by an intermetallic connection, normally achieved by so-called pressure welding.

The components of the sandwich unit can, however, also be connected in surface bonded relationship to one another by soldering.

The theory of the invention can also be applied to materials known and normally used for cooking and/or boiling utensils of the above-described design. This applies especially to alloy compositions. The container base and consequently the overall container have, according to the preferred embodiment of the invention, a metal thickness of 0.6 to 1.25 mm. The thermal conductor plate has a suitable thickness of preferably 4 to 8 mm, while the plate cover (especially if made from an aluminum alloy) has a preferred thickness of 0.5 to 0.8 mm and is according to the above rule thinner than the container sheet metal.

Preferably the ferromagnetic plate cover has a metal thickness, ($d_{PL}$) corresponding in consideration of the electromagnetic induction frequency to approximately the penetration depth, at which the induced current density has decreased to approximately 37% of its maximum value (and approximately 86% of the complete induced energy is transformed into heat, so that the austenitic container base has a metal thickness ($d_B$) complying with equation $d_B = X d_{PL}$, X being in the range 1.3 to 2.

Naturally various thermal expansions cannot be avoided in cooking and/or boiling utensils according to the invention. They are, however, fixed in the cooking and/or boiling utensils of the invention, preventing a disturbing deformation. In this context an embodiment of the invention of special significance has a sandwich unit whose collar is substantially flush against the container and forms a vertically gusset-shaped annular space with the container. The space is filled with the material of the thermal distribution plate and connected intermetallically or by soldering to the covering collar and the container, this area of the sandwich unit being elastically reshaped during thermal expansion and returns elastically to its base position during cooling of the cooking and/or boiling utensil.

Of special significance is also the center of the plate cover of cooking and/or boiling appliances according to the invention. It should not be too large and should form a stabilizing center for the geometry of the sandwich unit and especially the plate cover. The diameter of the center is purposely smaller than 50 mm. The center of the plate cover can be formed by the ferromagnetic sheet metal of the plate cover. The center of the plate cover has so to speak remained in the plate cover during the stamping out of the slots. There is, however, also the possibility to design the center of the plate cover as an austenitic steel blank, inset into a stamped cut-out of the plate cover, having purposely the same metal thickness as the plate cover. This may leave a free gap at the edge between the stamped cut-out and the blank. In one embodiment of the cooking and/or boiling appliance according to the invention, the material of the thermal distribution plate is openly arranged in the slots and possibly in the aforementioned gap of the plate cover. Another material can, however, also fill the slots or gaps level with the plate cover. Another embodiment of the invention is characterized in that austenitic steel blanks are inset into the slots of the plate cover.

A bottom-heated utensil according to the invention, therefore, can comprise:

a container having a container base of circular configuration composed of austenitic sheet steel, and a container casing extending upwardly from the base;

a thermal distribution plate coextensive with the base and affixed to an external surface thereof continuously over all of the surface;

a ferromagnetic plate cover of sheet steel overlying the plate and having a collar extending over a periphery of the plate to be substantially flush with the casing is a transitional area of the container between the base and the casing, the plate cover being affixed to an outer surface of the plate over substantially an entire area of the plate cover juxtaposed with the plate;

the plate cover in a cold state having a configuration ranging from level to concave;

the plate cover being formed with a plurality of radial cover recesses extending from a center region of the plate cover and terminating inwardly of the collar, at least some of the recesses being in the form of radial slots; and the base, the plate and the cover forming a sandwich structure with thicknesses of the base and cover and lengths and widths of the recesses and a diameter of the center region selected to resist deformation during thermal energy application to the container by thermal conduction through the sandwich structure.

According to a method aspect of the invention, a utensil of the type described is supported on a metallic surface or a ceramic hob and heated by thermal conduction or by electromagnetic induction from a spiral or flat coil whose axis is parallel to the axis of the utensil and preferably is coaxial therewith, the electromagnetic field frequency utilized being of the order of $10^4$ Hz.

BRIEF DESCRIPTION OF THE DRAWING

The above and other objects, features, and advantages will become more readily apparent from the following description, reference being made to the accompanying drawing in which.

SPECIFIC DESCRIPTION

The cooking and/or boiling utensils shown in these Figures are of a diameter usual for household cooking and/or boiling appliances. The cooking and/or boiling utensils are suited for bottom thermal energy application through thermal conduction or application of thermal energy through electromagnetic induction. They are consequently usable on metal surfaces or ceramic hobs of electrically or gas-heated ovens or induction ovens. The frequency of an induction oven is approximately 25,000 Hz.

The utensil includes a horizontally round container 1, made from austenitic sheet steel (stainless steel) for cooking and/or boiling media with a container casing 2 and a container base 3, a thermal distribution plate 4 connected flush against the container base, made of a heat-conducting metal with a specified thickness and a ferromagnetic plate cover 5 with a sheet steel covering collar 6 positioned flush against the container 1 in the transitional area between the container base 3 and the container casing 2 with at least a predominately ferritic structure. The plate cover 5 is arranged flush against the thermal distribution plate 4.

Figure 2:
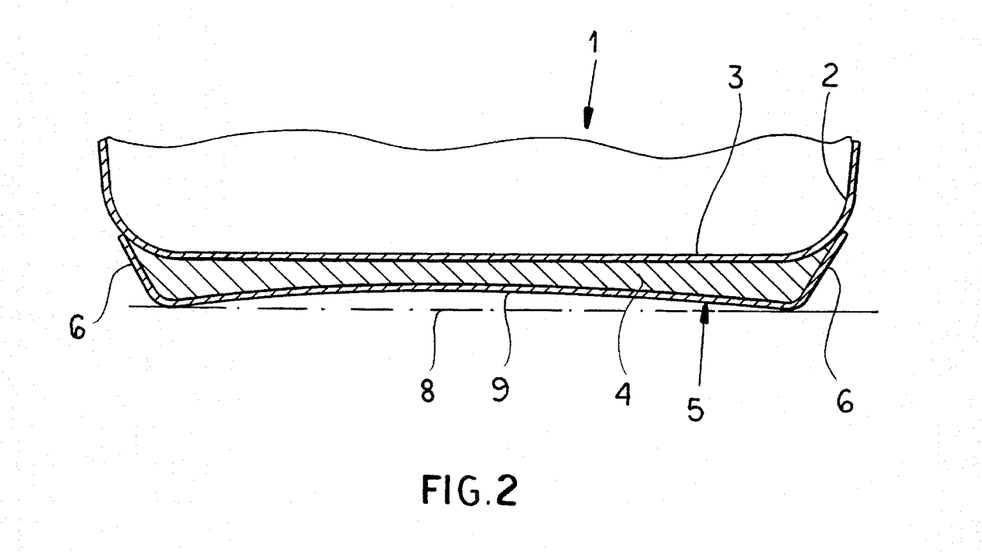
FIG. 2 is a view similar to FIG. 1 showing a utensil with exaggerated concave cold surface geometry of the plate cover.

The plate cover 5 contains the cover recesses 7. In the embodiment of the invention the cooking and/or boiling utensil is in principle designed in such a way, that the plate cover 5 has a slightly concave form 9 compared to the support surface 8 in its cold condition, the so-called cold surface geometry. This is exaggerated in FIG. 2.

Figures 5, 6, 7:
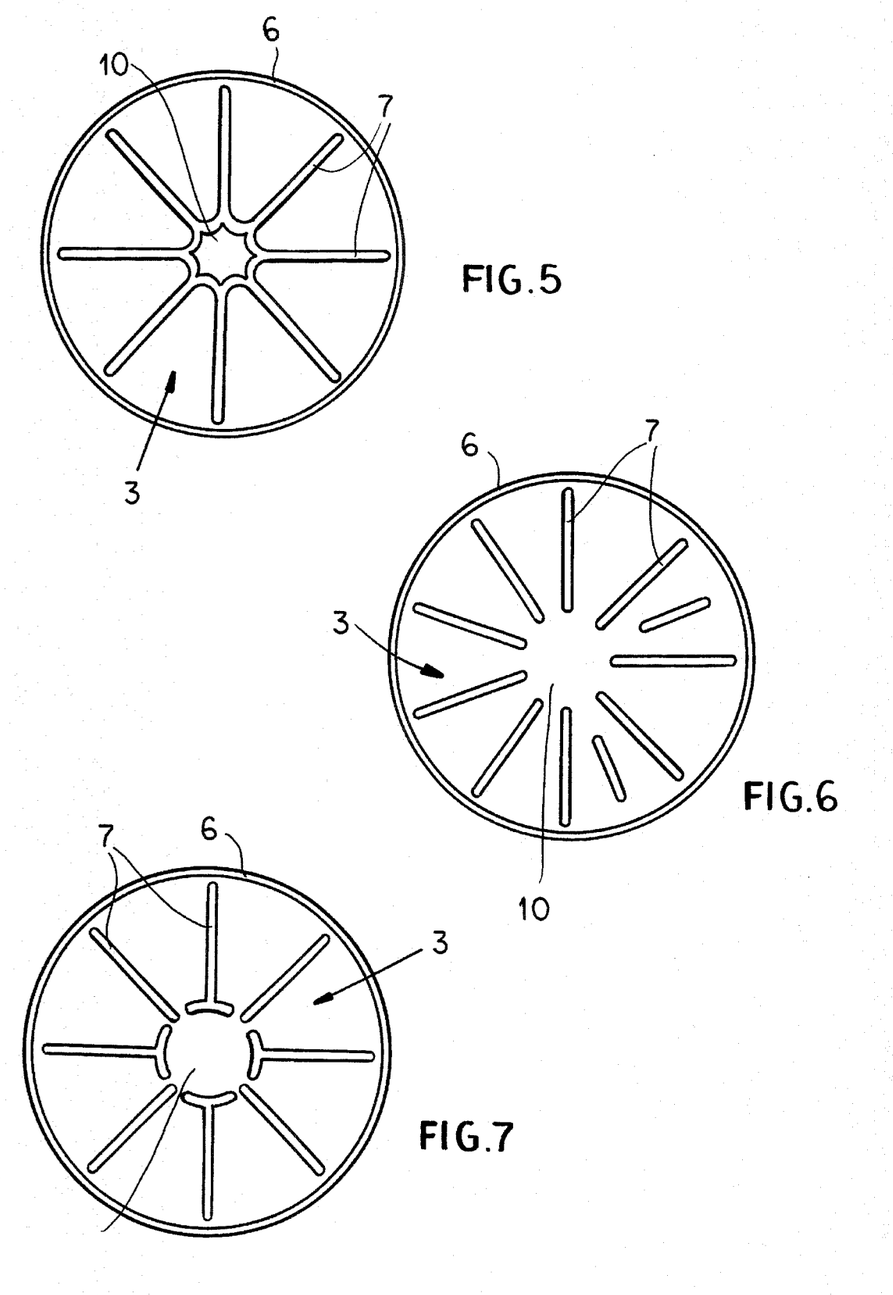
FIGS. 5, 6 and 7 are bottom plan views which show the surface of the cap cover of the cooking and/or boiling appliance of the invention in different embodiments.

The plate cover 5 consists of a ferromagnetic sheet metal. It contains cover recesses 7, mainly formed as radial slots. The radial slots start at the center 10 which can be smaller than shown. The cover recesses 7 end before the covering collar 6, as especially apparent in FIGS. 5, 6 and 7.

In the cooking and/or boiling utensil according to the invention, the container base 3, the thermal distribution plate 4 and the plate cover 5 form a sandwich unit 3, 4, 5 in which the sandwich components are arranged flush against one another, i.e. by an intermetallic or soldered connection.

Figure 1:
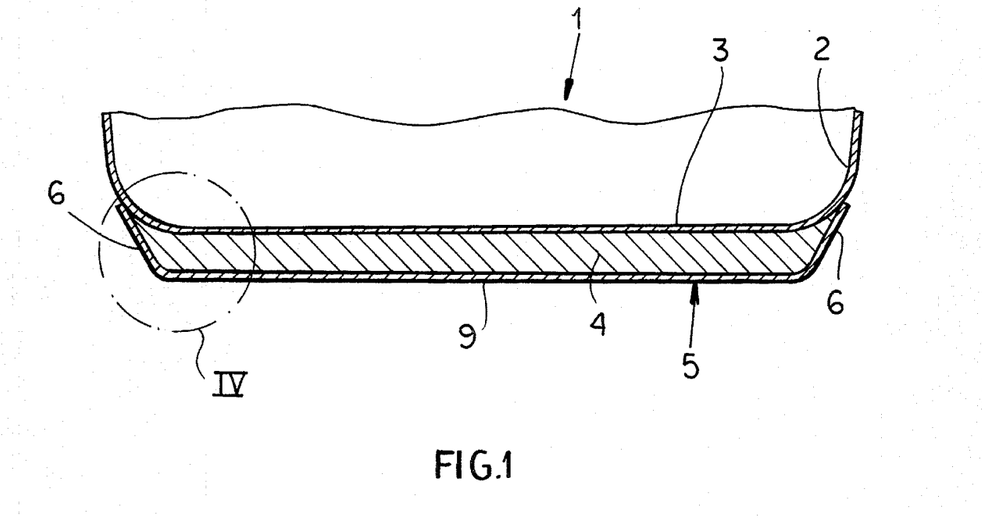
FIG. 1 is a vertical section of the base part of the cooking and/or boiling utensil of the invention.
Figure 3:
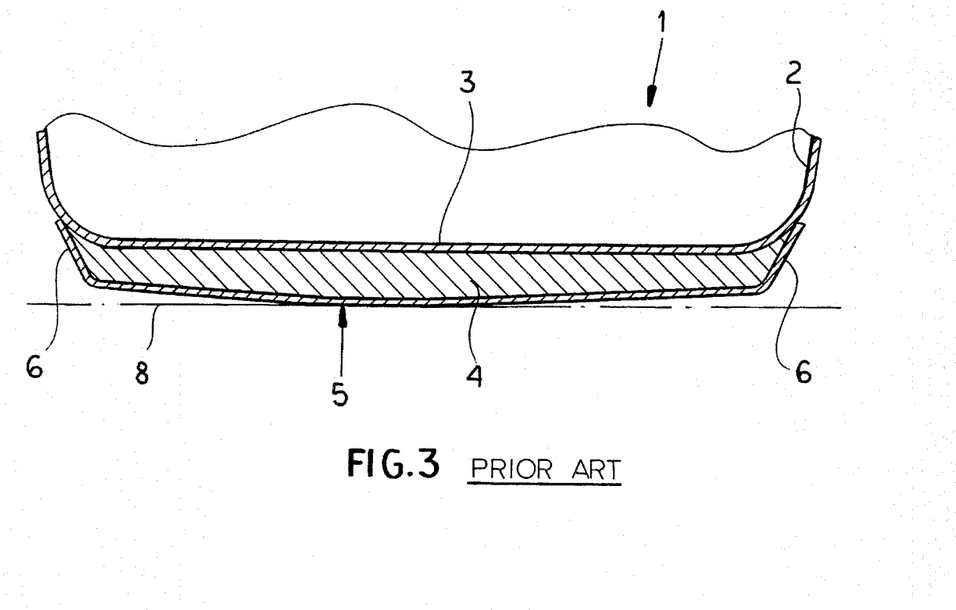
FIG. 3 is a sectional view of a prior art utensil showing the disturbing deformation.

The sandwich unit 3, 4, 5 is sufficiently deformation-proof due to the adjustment of the sheet metal thickness of the container bases 3 and the metal thickness of the plate cover 5 on one hand and the length and the width of the cover recesses 7 and the diameter of the center 10 on the other, during application of thermal energy through thermal expansion. FIG. 3 explains the meaning of deformation in this context. When comparing FIG. 3 with FIG. 1, a convex deformation of plate cover 5 compared to the support surface 8 is noticeable. FIG. 3 exaggerates this deformation. In the deformation shown in FIG. 3 also the thermal transfer between the plate cover 5, the thermal distribution plate 4 and consequently the container base 3 of the cooking and/or boiling unit is impaired for transfer of thermal energy through thermal conduction. The drawings are not to scale.

In particular, the container base and container casing or wall can have a sheet metal thickness in the range of 0.6 to 1.25 mm, the thermal distribution plate can have a thickness in the range of 4 to 8 mm and can be composed of copper, and the plate cover 5 can be composed of stainless steel with a sheet metal thickness in the range of 0.5 to 0.8 mm.

Figure 4:
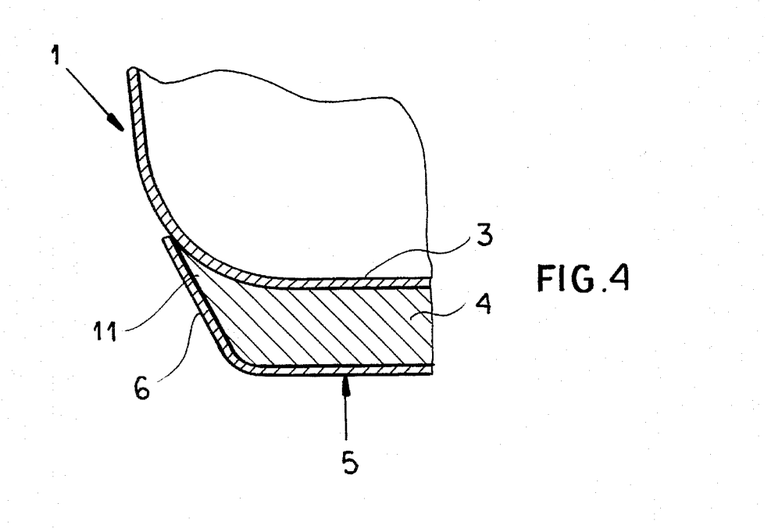
FIG. 4 is a section IV of FIG. 1 and considerably enlarged compared to FIG. 1.

The components of the sandwich units 3, 4, 5, are connected to one another by intermetallic connections, can, however also be connected by soldered connections. FIG. 4 shows that the sandwich units 3, 4, 5, form a vertically gusset-shaped 11 annular space compared to the container with the covering collar 6 positioned flush against the container 1, in which the material of the thermal distribution plate 4 is inserted, being connected to the covering collar 6 and the container 1 by intermetallic or soldered connections. In this way an area of the sandwich units 3, 4, 5, is provided in the cooking and/or boiling appliance of the invention being elastically deformable during thermal expansion. This area operates like a clamping ring. The center 10 of the plate cover 5 can be made of the ferromagnetic metal of the plat cover 5. The center 10 of the plate cover 5 can, however, also be made of an austenitic sheet metal blank positioned in a stamped cut-out of the plate cover, having the same metal thickness as the plate cover. In the cover recesses 7 referred to in FIGS. 5, 6 and 7, the material of the thermal distribution plate 4 is openly arranged. The cover recesses 7 could, however, also contain austenitic metal blanks.

Figure 8:
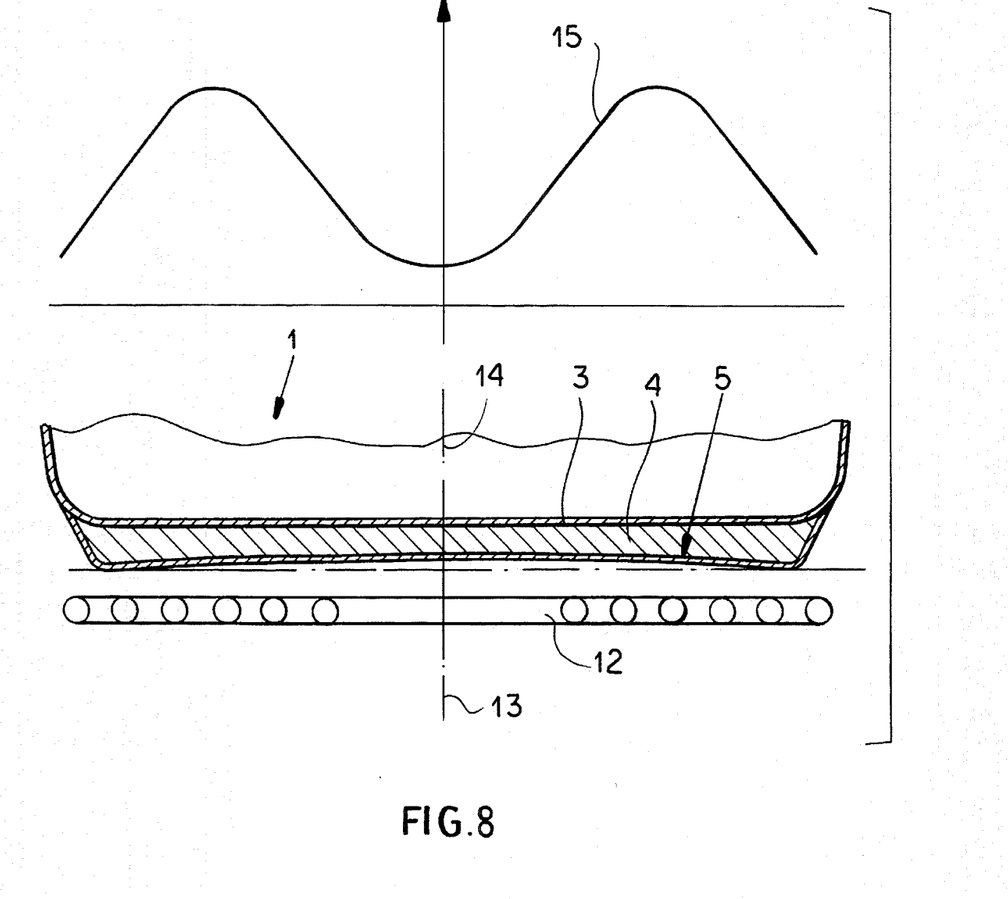
FIG. 8 is a graph which shows the utensil of FIG. 1 and the current density distribution in the plate cover on applying thermal energy through electromagnetic induction according to the invention.

From FIG. 8 it is apparent that an induction coil 12, e.g. a flat coil, having an axis 13 along which the axis 14 of the cooking and/or boiling appliance placed on the support surface of the induction stove is coaxial, serves for heating. A corresponding induction field is formed and the energy density of the inductive heat in the sandwich components 3, 4, 5, distributes itself as shown in FIG. 8 by graph 15. The ordinate corresponds to a diametrical section through the cooking and/or boiling utensil according to the invention with the x-axis portraying the energy density.

Figure 9:
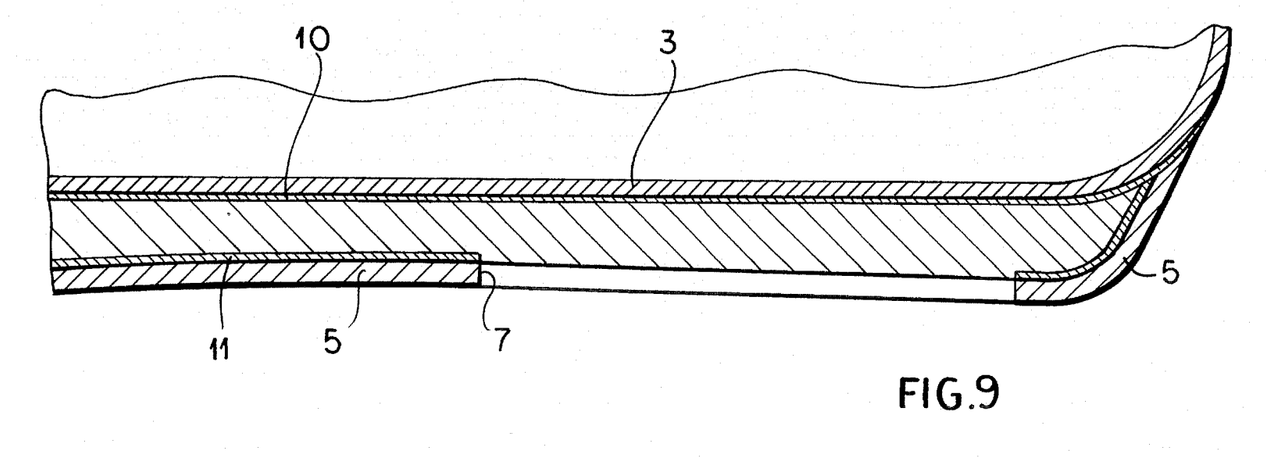
FIG. 9 is a cross sectional view through a portion of the bottom of a cooking utensil according to an aspect of the invention.

From FIG. 9, for example, it can abe seen that the slot 7 in which metal cover 5 is open and receives with at least limited penetration into this slot, the material of the heat distribution plate 4. In this embodiment, solder layers 10 and 11 surface-bond the distribution plate 4 to the container base 3 and to the cover plate 5.

Figure 10:
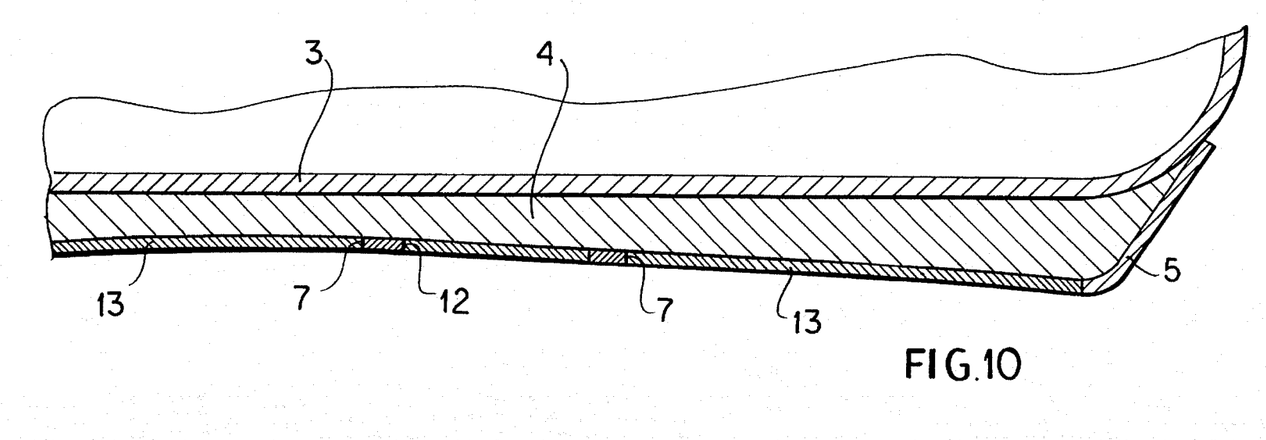
FIG. 10 is a view similar to FIG. 9 and taken in section along the line X—X of FIG. 11.
Figure 11:
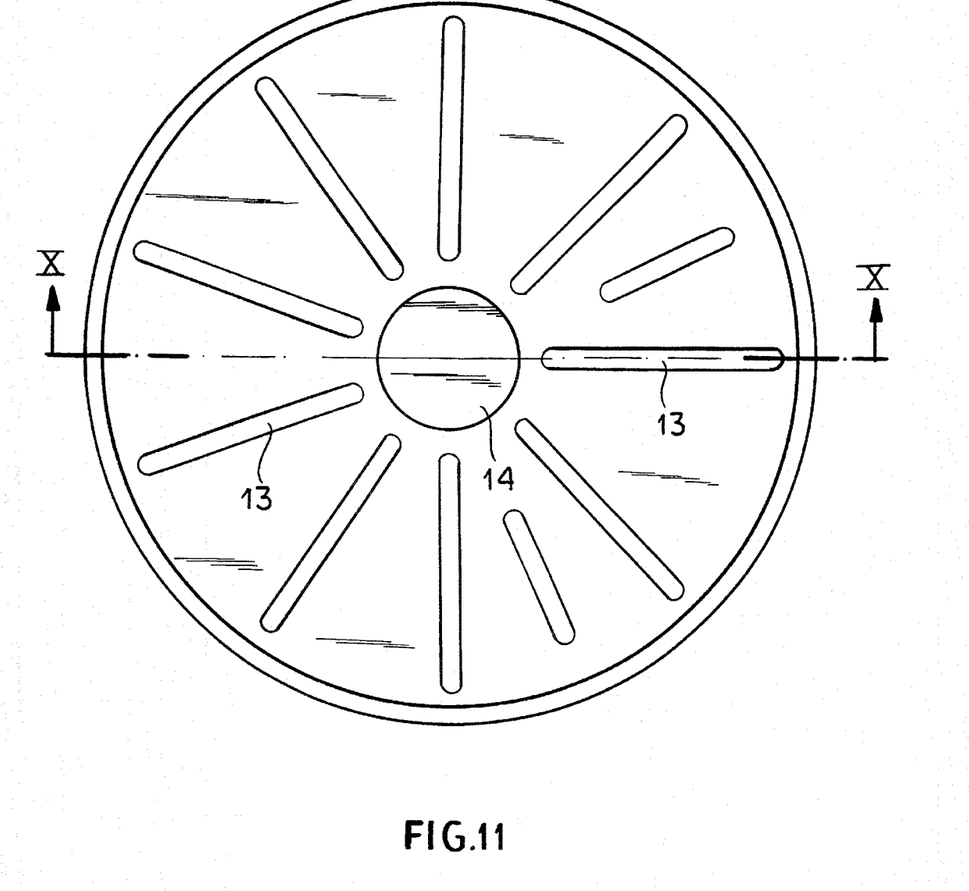
FIG. 11 is a bottom plan view of the utensil of FIG. 10.

In the embodiment of FIGS. 10 and 11, however, a center cutout 12 is provided in addition to the slots 7 and the cutouts 7 and 12 are filled with metallic inserts 13 and 14 which can be stainless steel as contrasted with the ferrometallic steel of the cover plate 5 or of a different material altogether. The copper distribution plate 4 and the base 3 of the container are also visible in FIG. 10.

We claim:

1. A bottom-heated utensil comprising:

a container having a container base of circular configuration composed of austenitic sheet steel, and a container casing extending upwardly from said base;

a circular thermal distribution plate separate from but coextensive with said base and affixed to an external surface thereof continuously over all of said surface said thermal distribution plate terminating at a transitional area of said container between said base and said casing;

a ferromagnetic plate cover of sheet steel overlying said plate and having a collar extending over a periphery of said plate to be substantially flush with said casing in said transitional area of said container between said base and said casing, said plate cover being affixed to an outer surface of said plate over substantially an entire area of said plate cover juxtaposed with said plate;

said plate cover in a cold state having a configuration ranging from level to concave;

said plate cover being formed with a plurality of radial cover recesses extending from a center region of said plate cover and terminating inwardly of said collar, at least some of said recesses being in the form of radial slots; and said base, said plate and said cover forming a sandwich structure with thicknesses of the base and cover and lengths and widths of said recesses and a diameter of said center region selected to resist deformation during thermal energy application to said container by thermal conduction through said sandwich structure.

2. The bottom-heated utensil defined in claim 1 wherein said thermal distribution plate is surface-bonded to said base and said plate cover is surface-bonded to said thermal distribution plate by intermetallic connections.

3. The bottom-heated utensil defined in claim 1 wherein said thermal distribution plate is surface-bonded to said base and said plate cover is surface-bonded to said thermal distribution plate by solder connections.

4. The bottom-heated utensil defined in claim 1 wherein said base has a thickness of substantially 0.6 to 1.25 mm, said thermal distribution plate has a thickness of substantially 4 to 8 mm and said plate cover has a thickness of substantially 0.5 to 08 mm.

5. The bottom-heated utensil defined in claim 1 wherein a gusset is formed between said collar and said container and is filled with material of said thermal distribution plate.

6. The bottom-heated utensil defined in claim 1 wherein said plate cover has a center composed of the ferromagnetic sheet steel.

7. The bottom-heated utensil defined in claim 1 wherein the center of said plate cover is an inset of austenitic sheet metal having the same metal thickness as the plate cover.

8. The bottom-heated utensil defined in claim 1 wherein material of the thermal distribution plate is exposed through said slots.

9. The bottom-heated utensil defined in claim 1, further comprising austenitic sheet metal insets in said slots.

10. A cooking process utilizing a bottom-heated utensil comprising:

a container having a container base of circular configuration composed of austenitic sheet steel, and a container casing extending upwardly from said base;

a thermal distribution plate coextensive with said base and affixed to an external surface thereof continuously over all of said surface;

a ferromagnetic plate cover of sheet steel overlying said plate and having a collar extending over a periphery of said plate to be substantially flush with said casing is a transitional area of said container between said base and said casing, said plate cover being affixed to an outer surface of said plate over substantially an entire area of said plate cover juxtaposed with said plate;

said plate cover in a cold state having a configuration ranging from level to concave;

said plate cover being formed with a plurality of radial cover recesses extending from a center region of said plate cover and terminating inwardly of said collar, at least some of said recesses being in the form of radial slots; and said base, said plate and said cover forming a sandwich structure with thicknesses of the base and cover and lengths and widths of said recesses and a diameter of said center region selected to resist deformation during thermal energy application to said container by thermal conduction through said sandwich structure;

said process comprising selectively heating a substance in said container by thermal conduction through said sandwich structure from a surface supporting said utensil thereon; and applying thermal energy to said substance by electromagnetically heating said sandwich structure through an induction coil having an axis parallel to an axis of the utensil and energizing said induction coil with an electromagnetic frequency of the order of $10^4$ Hz.

* * * * *